T. E. TURNER.
HAY PRESS.
APPLICATION FILED FEB. 15, 1909.
932,517.
Patented Aug. 31, 1909.
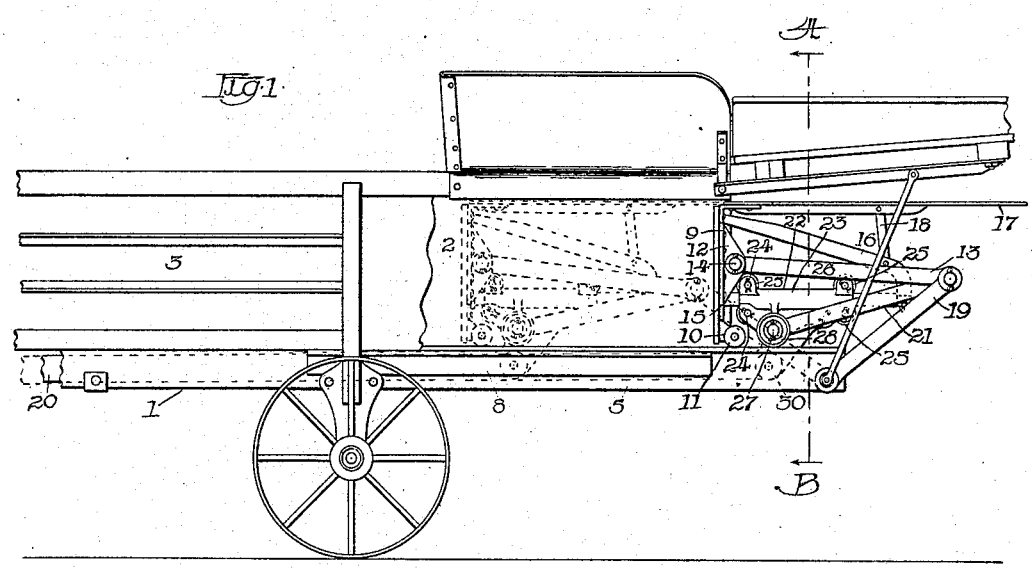
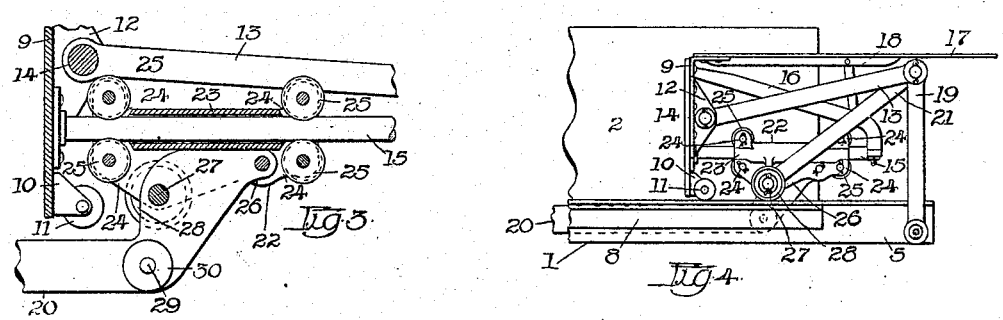
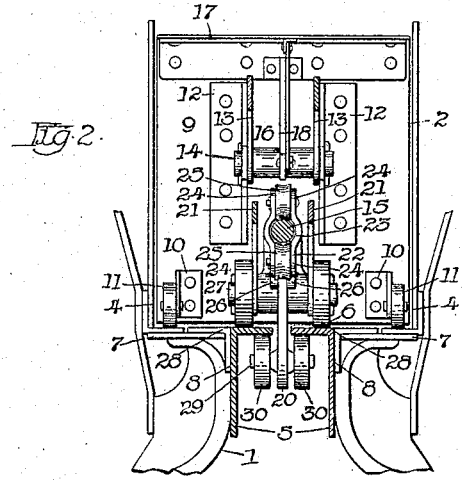
Witnesses:
F. W. Hoffmeister
Thos. Kiely
Inventor
Thomas E. Turner
By E. W. Burgess
Attorney

UNITED STATES PATENT OFFICE.

THOMAS E. TURNER, OF SPRINGFIELD, OHIO, ASSIGNOR TO INTERNATIONAL HARVESTER COMPANY, A CORPORATION OF NEW JERSEY.

HAY-PRESS.

932,517.  Specification of Letters Patent.  Patented Aug. 31, 1909.

Application filed February 15, 1909.  Serial No. 477,874.

*To all whom it may concern:*

Be it known that I, THOMAS E. TURNER, a citizen of the United States, residing at Springfield, in the county of Clark and State of Ohio, have invented certain new and useful Improvements in Hay-Presses, of which the following is a specification.

My invention relates to hay presses, and in particular to improvements upon the construction of the toggle mechanism forming part of the plunger actuating means, as shown in Patent No. 836,653, November 20, 1906, Frank A. Ryther, and is designed to more effectively guide the presser head as it is caused to move forward and backward in the press chamber, and it consists in an improved construction of the guide block forming part of the toggle mechanism, and in means for more rigidly connecting the stem that operates in the guide block with the presser head, as shown in the accompanying drawing, in which—

Figure 1 represents a side elevation of part of a hay press having my invention forming a part thereof; Fig. 2 is a partial cross section of Fig. 1 along the line A—B thereof; Fig. 3 is a detail drawing, partly in section, illustrating the construction of the guide block and the manner of its operation in connection with the presser head stem; and Fig. 4 is a detached detail drawing representing a side elevation of the toggle mechanism in one of its operative positions.

Like reference characters designate the same parts throughout the several views.

1 designates the frame of the press; 2 the press chamber in the rear end thereof, and 3 the bale chamber. The bottom of the frame includes corner angle bars 4 and centrally arranged angle bars 5, having their upper horizontal legs spaced apart in a manner to form a longitudinal slot 6, a plate 7 and angle bars 8, which are connected with and support the bars 4 and 5.

The presser head consists of a single flat plate 9, having secured to its lower corners lugs 10, having studs upon which are journaled rollers 11. At the center of the plate is secured a pair of ears 12 that receive between them the forward end of a plunger bar 13, and 14 designates a pin that pivotally connects the bar with the ears. Below the plunger, and near the bottom of the plate, is rigidly secured the forward end of a rearwardly projecting stem 15, having its rear end connected with the upper edge of the plate by means of a rigid brace member 16, the stem and the brace forming, with the plate, a triangle, of which the latter is the base.

17 designates a shield, having its forward end secured to the presser plate and its rear end supported by means of a bar 18, having its upper end secured to the shield 17 and its lower end to the brace member 16.

19 designates toggle bars having their lower ends pivotally connected with the frame 1, and their upper ends with the rear end of the plunger bar 13 in a manner forming a toggle connection between the plunger bar and press frame. A draw bar 20 extends forwardly beneath the press frame, having its rear end pivotally connected with the upper ends of the toggle bars 19 and the rear end of the plunger bar by means of links 21. The rear end of the draw bar is turned upwardly, and to its upturned end is secured a guide block 22, including a sleeve portion 23, having at opposite ends thereof, and upon its upper and lower sides, ear portions 24, between which are journaled anti-friction rollers 25, having concave peripheries adapted to contact with the stem 15 that is received by the sleeve portion 23 in a manner to relieve the friction of the operative parts and prevent the sleeve from binding upon the stem during the operation of the machine. The guide block is provided with oppositely arranged boss portions 26 upon its lower side that are adapted to receive between them the upturned end of the draw bar, and 27 represents a pin passing through the bosses and bar and having journaled upon their opposite ends rollers 28 that roll upon the upper surfaces of frame members 5 upon opposite sides of the slot 6, and 29 represents a pin passing transversely through the draw bar below the horizontal legs of the frame members 5, and 30 represents rollers journaled upon opposite ends of the pin and adapted to roll upon the lower surface of said legs.

In operation, the guide block acts as a sliding support for the stem 15.

What I claim as my invention, and desire to secure by Letters Patent, is:

1. A hay press including, in combination, a press frame, a presser head, a toggle mechanism connecting said head with said frame, a draw bar connected with said toggle mechanism, a guide block secured to said draw bar, a rearwardly projecting stem secured to said head near its lower edge and slidably received by said guide block, and a supporting brace having its forward end secured to the upper edge of said head and its rear end secured to the rear end of said stem.

2. A hay press including, in combination, a press frame, a presser head, a toggle mechanism connecting said head with said frame, a draw bar connected with said toggle mechanism, a guide block secured to said draw bar, a rearwardly projecting stem secured to said head near its lower edge, a supporting brace having its forward end secured to said head near its upper edge and its rear end to the rear end of said stem, said guide block having a longitudinally arranged sleeve portion adapted to receive said stem in a slidable manner, and oppositely disposed rollers journaled at opposite ends of said sleeve and adapted to engage with the upper and lower sides of said stem.

THOMAS E. TURNER.

Witnesses:
  HOMER GUYTON,
  W. B. KENDIG.